No. 851,632. PATENTED APR. 23, 1907.
P. SYNNESTVEDT.
MOTOR.
APPLICATION FILED MAY 7, 1904.

WITNESSES:

INVENTOR:
Paul Synnestvedt

No. 851,632. PATENTED APR. 23, 1907.
P. SYNNESTVEDT.
MOTOR.
APPLICATION FILED MAY 7, 1904.

WITNESSES:

INVENTOR:

UNITED STATES PATENT OFFICE.

PAUL SYNNESTVEDT, OF PITTSBURG, PENNSYLVANIA, ASSIGNOR TO SYNNESTVEDT MACHINE COMPANY, OF PITTSBURG, PENNSYLVANIA, A CORPORATION OF PENNSYLVANIA.

MOTOR.

No. 851,632.  Specification of Letters Patent.  Patented April 23, 1907.

Application filed May 7, 1904. Serial No. 206,857.

*To all whom it may concern:*

Be it known that I, PAUL SYNNESTVEDT, a citizen of the United States, residing at Pittsburg, in the county of Allegheny and State of Pennsylvania, have invented certain new and useful Improvements in Motors, of which the following is a specification.

This invention has reference to an improvement in motors and is particularly designed for variable speed motors such as are used, for example, in automobile service.

In order that my invention may be better understood I will describe the same in connection with the accompanying drawings, wherein—

Figure 2 shows the second position, Figure 3 the third position, Figure 4 the fourth position, and Figures 5 and 6 indicate respectively the 1st and 2nd reverse positions, while

Figure 7:
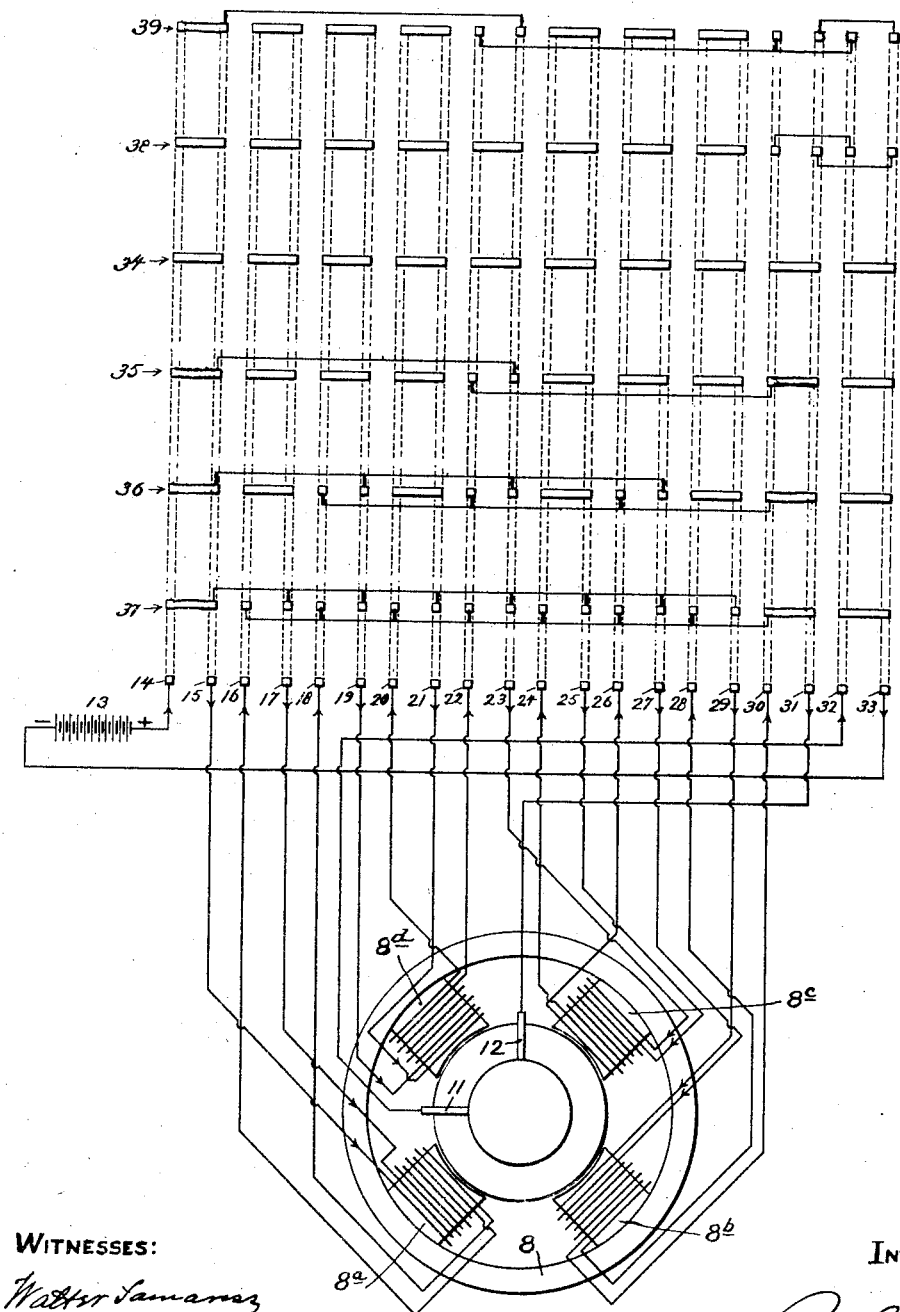
Figure 7 is a diagram showing the wiring of the controller and of the motor in case a 4-pole motor is used, all shown together.

Referring now first to Figure 7 it will be seen that I have therein indicated a 4-pole motor, which I will mark 8, the poles whereof 8$^a$, 8$^b$, 8$^c$ and 8$^d$ are all provided with coils preferably wound in multiple, that is by two wires 9 and 10 taken from different reels and laid on the mold for the pole coils parallel, that is both laid on it at the same time, as indicated diagrammatically in the drawing, leaving the poles so that each coil has four terminals which will give on the 4-pole motor shown 16 field leads in addition to the two armature leads, which are marked 11 and 12.

A battery is indicated diagrammatically at 13 and the several fixed terminals of the controller are numbered respectively 14 to 33 inclusive.

The several positions are marked as follows: the first one, forward, 34, the second forward position 35, the third forward 36, and the fourth forward position 37, while the first reverse position is marked 38, and the second reverse position 39.

Figure 1:
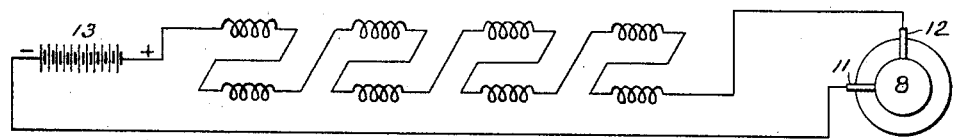
Figure 1 is a view of a wiring diagram showing the first forward position of the motor constructed in accordance with my improvement.
Figure 2:
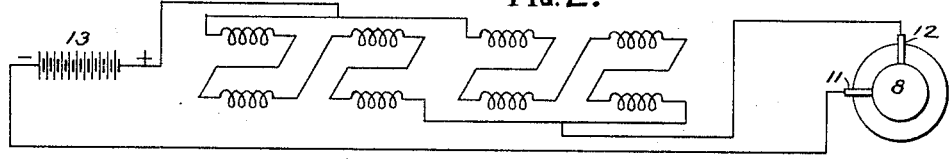
Figure 3:
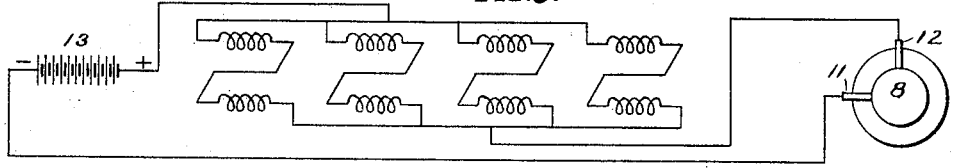
Figure 4:
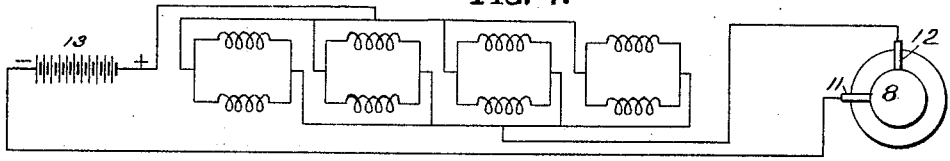

Considering now the Figures 1 to 6 on the first sheet of the drawings, it will be seen that I have therein indicated the motor 8, the battery 13, the brush leads 11 and 12, and also the field wiring, the several positions being shown diagrammatically. From examination of these figures it will appear that, as indicated in Figure 1, when the controller is in the 1st position, marked 34 on Figure 7, all of the field winding is in series, although each several coil of each pole is wound with double parallel strand of wire. It will further appear, as indicated in Figure 2, that in the 2nd position, numbered 35 on Figure 7, the field windings are divided, the parallel strands in each separate field being still in series but two and two of the fields being in series multiple as shown. Figure 3 indicates the 3rd position, numbered 36 in Figure 7, which shows all four of the fields in parallel but the windings on each coil still in series, while in Figure 4 the four fields are still in parallel but the windings are also in parallel, the two strands 9 and 10 indicated on Figure 7 being companion conductors in the 4th position.

Figure 5:
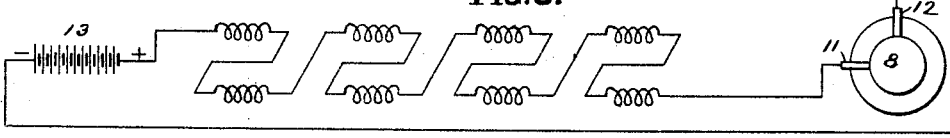
Figure 6:
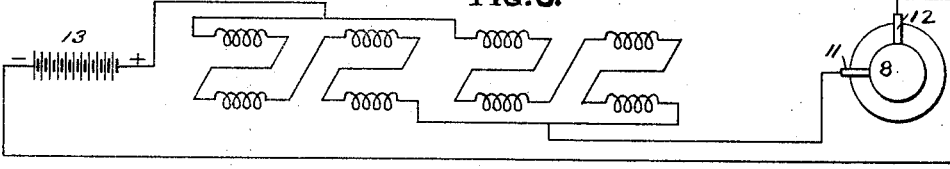

As to the reverse positions indicated in Figures 5 and 6, they are the same as the first two forward positions, except as to the change in the brush leads necessary to reverse direction of rotation of the motor.

It has been heretofore proposed to construct series motors wherein the winding of the fields has been commutated to vary the speed of the motor, such winding being in the 1st position all in series and then afterwards either partially cut out or else being so as to be in series multiple and afterwards all of the coils in multiple, and it is the object of my invention to improve on this form of motor construction to secure a 4th position in a 4-pole motor or in a motor with winding making it the equivalent of a 4-pole motor in which 4th position the field windings can be again commutated as shown to produce a larger conductivity and less resistance in the fields so as to gain still higher speed in the motor while having all of the current still traversing the field windings where it will do active work in the magnetization of the field poles.

It is a further object of my invention to place the windings on the fields in such manner that when current traverses the same in the 4th position the turns of the wire about the poles will all be equally affected and will all have equal effect on the poles, that is to say, by winding the wire on each pole coil in parallel strand and then on the 4th position, sending the current through them as parallel conductors, each conductor has the same relative relation to its pole as the other of the parallel conductors and therefore both act similarly and both carry their fair and proper share of current, there being no tendency to retard the flow of current more in one than in the other by the action of the counter-electro motive force, as would be the case were the coils wound separately and put on one after the other, that is one next the base and the other near the apex of the pole for example, or one nearer to the pole and the other surrounding that.

Another feature of my improvement to which I desire to call attention is the disposition of the several contact pieces on the barrel of the controller, it being observed that the two battery leads are the extreme outside leads, numbered respectively 14 and 33, and that the two armature leads 11 and 12 are connected respectively with the contacts 32 and 31, which are adjacent to the battery contact 33, which leaves all of the fixed terminals, 15 to 30 inclusive, as field terminals whereby, as indicated in the several positions shown in Figure 7 on the barrel of the controller, a very simple arrangement of the wiring of said barrel is obtained, the only necessity required in the first position being a series of double bars as shown in position numbered 34, while in the position marked 35 there are a series of double bars and single bars connected as indicated and requiring very little connection between different parts of the barrel, which simplicity is also observed in the positions marked 36 and 37. This comparatively simple form of barrel construction is obtained, as already indicated, by making the two outside battery leads on the fixed contacts putting the two brush leads next to one of the outside battery leads and making all of the remainder field leads with the current traveling in rotation first out and then in and then out and then in on each pair counting from the left to the right, as indicated by the arrow heads.

In experiments with motors constructed in practice in accordance with the diagrams given herewith it is shown that by the wiring arrangement indicated four different forward speeds are secured, approximately 4, 8, 12 and 15 miles per hour, depending of course on the gearing used, and in the 1st positions the current discharge is very low and the pulling torque high, while as the speed increases the counter-electro motive force tends to keep back the battery current so that in any position, and particularly in the starting positions, but slight current is necessary and there is no violent jump or heavy strain such as is encountered with many of the usual forms of motor construction.

Having thus described my invention and illustrated its use, what I claim as new and desire to secure by Letters Patent, is the following:

1. An improvement in motors comprising a coil composed of sets of parallel strands for each field pole, means for commutating the sets of coils whereby they are placed in series and then in parallel, and means for further commutating the windings of each coil whereby they are first in series and later in multiple in the set, substantially as described.

2. An improvement in motors comprising in combination a motor having windings on the field thereof adapted to be commutated in series and multiple, a battery, a controller for said battery and motor, said controller having its extreme outer fixed contacts connected with the battery leads, having the brush leads connected adjacent to one of said battery contacts and having several connections to each of the field terminals between said brush leads and said other battery leads, substantially as described.

3. In combination, a four pole motor having eight field windings and a controlling device therefor adapted to commutate said windings in series and series multiple, whereby to secure four speed variations there being equal windings on opposite poles, substantially as described.

4. In combination, a four pole motor having two separate windings to each pole, and a controlling device therefor adapted to commutate said windings in series and series multiple, whereby to secure four speed variations, substantially as described.

5. In combination, a four pole motor having eight field windings, and means for commutating the strands of each coil, whereby the current is caused to traverse the windings first in series and then through the wires of each coil in parallel, substantially as described.

In testimony whereof I have hereunder signed my name in the presence of the two subscribed witnesses.

PAUL SYNNESTVEDT.

Witnesses:
F. W. H. CLAY,
CHAS. H. EBERT.